(12) United States Patent
Lawler et al.

(10) Patent No.: US 10,775,783 B2
(45) Date of Patent: Sep. 15, 2020

(54) SYSTEM FOR ASYMMETRIC JUST-IN-TIME HUMAN INTERVENTION IN AUTOMATED VEHICLE FLEETS

(71) Applicant: Kevin Lawler, Crestview, FL (US)

(72) Inventors: Kevin Christopher Lawler, Berkeley, CA (US); Scott Christopher Locklin, Berkeley, CA (US)

(73) Assignee: Kevin Lawler, Crestview, FL (US)

( * ) Notice: Subject to any disclaimer, the term of this patent is extended or adjusted under 35 U.S.C. 154(b) by 96 days.

(21) Appl. No.: 15/229,059

(22) Filed: Aug. 4, 2016

(65) Prior Publication Data

US 2018/0039265 A1 Feb. 8, 2018

(51) Int. Cl.
| | |
|---|---|
| *G05D 1/00* | (2006.01) |
| *H04L 29/08* | (2006.01) |
| *G06Q 50/30* | (2012.01) |
| *B60W 50/14* | (2020.01) |
| *G06Q 10/08* | (2012.01) |

(52) U.S. Cl.
CPC ........... *G05D 1/0027* (2013.01); *B60W 50/14* (2013.01); *G06Q 10/083* (2013.01); *G06Q 50/30* (2013.01); *H04L 67/125* (2013.01); *G05D 2201/0213* (2013.01)

(58) Field of Classification Search
None
See application file for complete search history.

(56) References Cited

U.S. PATENT DOCUMENTS

| | | | |
|---|---|---|---|
| 5,367,456 A | 11/1994 | Summerville et al. | |
| 6,024,142 A | 2/2000 | Bates | |
| 6,347,139 B1 | 2/2002 | Fisher et al. | |
| 6,587,556 B1 | 7/2003 | Judkins et al. | |
| 8,718,861 B1 | 5/2014 | Montemerlo et al. | |
| 2004/0030448 A1 | 2/2004 | Solomon | |
| 2004/0030570 A1 | 2/2004 | Solomon | |
| 2013/0041576 A1 | 2/2013 | Switkes et al. | |
| 2014/0180501 A1 | 6/2014 | Kyllmann | |
| 2014/0207535 A1* | 7/2014 | Stefan | G05D 1/0022 705/7.42 |
| 2016/0334230 A1* | 11/2016 | Ross | G01C 21/3415 |
| 2017/0123429 A1* | 5/2017 | Levinson | G05D 1/0088 |
| 2017/0192423 A1* | 7/2017 | Rust | G05D 1/0238 |
| 2017/0308082 A1* | 10/2017 | Ullrich | G05D 1/0038 |

\* cited by examiner

*Primary Examiner* — Tuan C To
*Assistant Examiner* — Kelly D Williams
(74) *Attorney, Agent, or Firm* — Sanderson IP Law, Ltd.

(57) ABSTRACT

A bank of available remote human vehicle operators receives service requests to assume control of an automated vehicle via a service queue. The service queue triages remote vehicle control requests based on factors including skill level of available human vehicle operators, urgency of service requests, capabilities of available human vehicle operators, etc. Additional human vehicle operators may join a control session of an automated vehicle as observers and/or assistants to a controlling human vehicle operator. Human vehicle operators may be triaged among ongoing vehicle control sessions depending on the completion of vehicle control tasks and/or emergence of new requests from other automatic vehicles. Automatic vehicles may make service requests to the bank of available remote human vehicle operators including requested capabilities or operator skills based on data sensed regarding the environment of the vehicle.

17 Claims, 4 Drawing Sheets

SYSTEM FOR ASYMMETRIC JUST-IN-TIME HUMAN INTERVENTION IN AUTOMATED VEHICLE FLEETS

BACKGROUND OF THE INVENTION

There is currently (2016) intense interest in unmanned and automated vehicles. Companies such as Google (Alphabet Inc.) are road-testing driverless cars. Companies such as Tesla are implementing automated highway driving features in vehicles where a human driver is present. Remotely-controlled flying drones, with remotely-viewable cameras and other appendages, have been a consumer phenomenon. The United States Armed Forces are well-known to use large unmanned aerial drones in their combat operations. Such technology may be applied to boats and ships as well. Via consumer culture, such as mobile phones and so forth, interest in artificial intelligence and related applications is experiencing a resurgence. For at least two years early-adopters have claimed that automated vehicles are "already here," perhaps prematurely. However, the roads are still primarily filled with conventional cars, and it is a remarkable event to see something like a driverless test car on the road, something that can only happen in the few areas near where they are produced.

The popular optimistic belief seems to be that automated cars will be eventually everywhere, perhaps in only a few years. Among these expectations is that entire job industries will be made obsolete: the consensus opinion is that we will no longer need semi-truck drivers, or cab drivers, or pizza delivery men, or any number of occupations related to the human operation of vehicles. Some believe that personal ownership of cars will go away in favor of leasing summonable automated vehicles.

Related to this belief is the notion of a "fleet," that is, that the automated vehicles (again cars as an example) will be grouped by purpose, however general, so that groups of them are responsible for delivering pizzas, or for hauling semi-trailer loads, or for delivering furniture, or for carrying human passengers (like taxis or buses), or by merely being owned by the same firm, and so on.

Various schemes have been created for semi-autonomous vehicles to determine when they require human intervention. For example U.S. Pat. No. 8,718,861 "Determining when to drive autonomously." Prior inventions assume that the human controller of the semi-autonomous vehicle is actually inside the vehicle, and that there is one human controller per vehicle. This doesn't always make commercial sense, unless the vehicle cargo is human, and the vehicle cargo/potential controller of the vehicle is as alert as he would be if piloting the vehicle himself. The reality is, alert human attention is a resource which autonomous and semi-autonomous vehicles are supposed to conserve and minimize to realize efficiencies, so having alert human attention centralized and remote can enable higher degrees of automation and commercial utility in semi-autonomous vehicle fleets.

US patent application US20060271246A1 "Systems and methods for remote vehicle management" is a specific technology for remote monitoring of non-autonomous vehicles. A variation of this specific technology may be used for the end control terminal sensors and telemetry though some other specific end terminal technology must also be used for dynamic vehicle control.

US patent application US20040030448 "System, methods and apparatus for managing external computation and sensor resources applied to mobile robotic network" pertains to the use of external sensors and computational capabilities in robot swarms, where the swarms may have limited intercommunication and computational capabilities.

U.S. Pat. No. 5,367,456 "Hierarchical control system for automatically guided vehicles" describes a hierarchy of programs for controlling automated vehicles to provide differing levels of computer control to fleets of vehicles. The patent postulates that some of the functions may not be possible in the computers deployed in the automobiles, so they may be provided by remote computer control, rather than remote human control.

US patent application US20040030571 "System, methods and apparatus for leader-follower model of mobile robotic system aggregation" postulates mobile robots using follow the leader algorithms to reduce the computational complexity of piloting a large fleet of vehicles.

US patent application US20130041576 "Systems and Methods for Semi-Autonomous Convoying of Vehicles" postulates a different specific scheme of aggregating vehicle convoys, particularly as an energy saving technology, though also to save computational resources. Our scheme may take advantage of vehicle convoys as a way of simplifying and reducing the number of human controllers required for a large fleet of vehicles.

U.S. Pat. No. 6,024,142 "Communications system and method, fleet management system and method, and method of impeding theft of fuel" is a passive monitoring system for detecting and mitigating theft of fuel using a specific RFID technology. This type of system essentially tags the vehicle using RFID monitoring and only allows certain vehicles to take on fuel. The communication link is between vehicle and fuel depot; our method is a more broad communication link back to central control location.

The use of human agents to service semi-automated computer equipment has a long history in the Call Center industry. For example, U.S. Pat. No. 6,347,139 "System for automatically routing calls to call center agents in an agent surplus condition based on agent occupancy"—is a system for routing calls to agents based on their availability. U.S. Pat. No. 6,587,556 "Skills based routing method and system for call center" is a patent for routing telephone calls to human agents based on available skill sets. We extend this basic concept to the routing of service requests from semi-autonomous vehicles to a centralized group of human operators based on their specific skills and aptitudes for servicing semi-autonomous vehicle intervention requests.

FIELD OF THE INVENTION

The present invention relates to the use of computerized networks and communications systems to allow human operators to assist in the various activities that automated vehicles may be required to perform.

STATE OF THE ART

The commercial state of the art is far behind the described invention. Self-driving cars are in their infancy: some test vehicles are currently on the roads (each monitored closely, often by more than one person), and hobbyist drones are commercially available. The automated vehicles are not yet performing real work in fleets, except as proof of concept. Because neither drones nor self-driving cars nor other vehicles are deployed in any manner of automated and mature commercial use, there is no need yet for something like a bank of operators, and so nothing like that exists, much less in the manner described.

The military state of the art, which comprises the overall state of the art, is at least closer, but still far away because the nature of the work is unlikely to bring them to this application (at least until they begin to take advantage of regular commercial advances). Moreover, the nature of such vehicles is that the phrase "unmanned" means "remotely-piloted", rather than "automated": it is intended that they perform their objectives via human control (which is planned and prerequisite), and given their funding situation there is no pressing economic need for the system to be automated. Military UAVs are performing real tasks, and because of the nature of their mission, and because of the funding allocated to defense services, their vehicles are assigned and monitored by one or more persons continually, and a randomized anomaly-resolving system is currently too inappropriate and cavalier, and so has not been conceived.

BRIEF SUMMARY OF THE INVENTION

Despite the advances in automated vehicles, the present and near future state of the art is such that they will face any number of so-called "last mile" problems: though the bulk of any particular vehicle objective might be automated, travelling on an empty freeway for instance, a smaller portion of the vehicle objective will escape being performed in a fully automated fashion, making it necessary to introduce some level of non-automation or human intervention into the system. Because it is contrary to the aims of automated vehicles to have a human driver physically present inside the vehicle, this presents a problem. Should an automated vehicle find itself in such a situation, it would be desirable for it have some option for resolving the issue. This scenario sets the groundwork for the description of the system and method to follow.

One potential solution to this problem is to have a designated human operator monitoring the progress of the vehicle from a remote location. What this does is pull the human out of the car, but it does not remove the requirement for a human's attention to be present at all times. Human attention is in fact the expensive part and the part the automated car would most like to avoid. A strategy where there are multiple human operators each with their attention devoted to one of multiple automated vehicles manifests the same problem, only on a larger scale. This invention is not an invention where human operators are assigned to vehicles in a one-to-one fashion and continually monitor them. The point of the invention is to spread the attention of a smaller number of people over a larger number of vehicles, and to meet the needs of the vehicles by making multiple temporary and arbitrary assignments which over time will eventually and necessarily involve each person in multiple completed vehicle assignments. This invention is a servicing queue for producing on-the-fly corrective decisions for vehicle intelligence, it is not a diagnostic reporting or vehicle repair system. This invention intervenes in what the vehicle does but generally does not affect what the vehicle is.

Consider now a fleet of automated vehicles. Such a fleet consists of multiple automated or semi-automated vehicles, all of which may be, but are not required to be, categorized by some purpose: they are food delivery vehicles, they are box shipment delivery vehicles, they are taxis, etc. Given that near future available automated vehicle technologies are known to solve most of the problems inherent in transit, at any given time the probabilistic expectation is that the bulk of the automated vehicles are operating normally and do not need intervention; and that a "small" fraction of the automated vehicles will have encountered states with which they are incapable of resolving given their automated systems of coping. Because the expectation is that this fraction is small, in general we can handle a fleet of so many automated vehicles with a smaller number of human operators, who may be assigned for temporary periods to any of the vehicles in need of attention or facing difficulties. From the operator's perspective, his job will consist of, in one scenario, solving vehicle problems for a sequence of different vehicles throughout the day. When, the number of ailing vehicles falls below the number of operators, the operators left without such work may rest or perform some other task. When the number of ailing vehicles exceeds the number of operators, the unattended vehicles may pause or enter into a holding pattern while either the backlog is cleared or the number of operators increases. The system may even increase the number of potential operators by calling out to another bank or banks of operators, in the manner that re-insurers insure insurers. Some ailing vehicles may require emergency servicing on a very low latency time scale, for example in the event of an unidentifiable road obstacle or rapid maneuver; such events may be routed to special human operators who have very fast reflexes or are kept at a high level of attention.

Vehicles within such a fleet may serve different roles, provided the abilities of the human operators are general enough to cope. It is also not necessary that the vehicles within the fleet have homogeneous ownership: various economic factors may induce companies of the same (or near-enough) type, say, pizza delivery companies, to retain the services of the same asymmetric intervention company. Because such a service is not a core competency of pizza companies nor a brand-distinguishing characteristic, this outcome is likely for any company without strong dedication to vertical integration. For similar business reasons, one pizza delivery company may choose to engage multiple asymmetric intervention companies in the assistance of its fleet, for instance, in order to avoid lock-in.

A complete example, which should not be construed as limiting the scope, of the invention in action is as follows. A customer orders a pizza to his address in a gated apartment community. The pizza is dispatched in a self-driving car. The car leaves the pizza shop with the pizza. It is peak pizza-ordering time, and the car is one of many the pizza shop currently has on the road. While the other cars continue unobstructed, upon reaching the gated community, the dispatched car is stopped at a tollbooth style gatehouse with an on-duty guard attendant. The vehicle detects it cannot continue. The invention activates. A remote human operator is assigned to the vehicle, who examines the situation. The guard wants to know which apartment the vehicle is headed to and why. The operator gives the guard this information. The guard raises the gate arm and the vehicle may proceed. The operator or the vehicle register the success, and the operator's participation in the scenario is scheduled to end. The vehicle continues on to the customer's house where the pizza is delivered successfully.

We give a few specific examples from the broad class of exceptional occurrences which may happen to an automated vehicle, in this case a car, causing it to request human intervention. A rock hits the vehicle's navigation system (or some other fault occurs) and a human operator is needed to control the car via camera. Children are playing with the car or vandalizing it, and a human operator is needed to assess the situation. An accident occurs and the car needs on-site human representation. The car is subject to a traffic stop by law enforcement and the vehicle needs a remote operator to communicate with the officer. The vehicle is stopped by customs and the operator must indicate to the customs officers what manner of goods the vehicle is carrying. The vehicle enters a loading dock and a human operator must issue instructions to the workers for delivery. Heavy snow or rain has put the automated guidance system in an unsafe mode in need of human operation. The car has hit a deer and a human operator is needed to review the situation. The car must refuel but only a conventional fueling station is nearby and so a remote human agent is needed to interact with the station attendant. The car is off-road. The GPS system is temporarily non-functional. A cop car may flash its lights to cause the vehicle to pull over. The vehicle may have to stop at a police-created drunk driving checkpoint.

DETAILED DESCRIPTION

Figure 1:
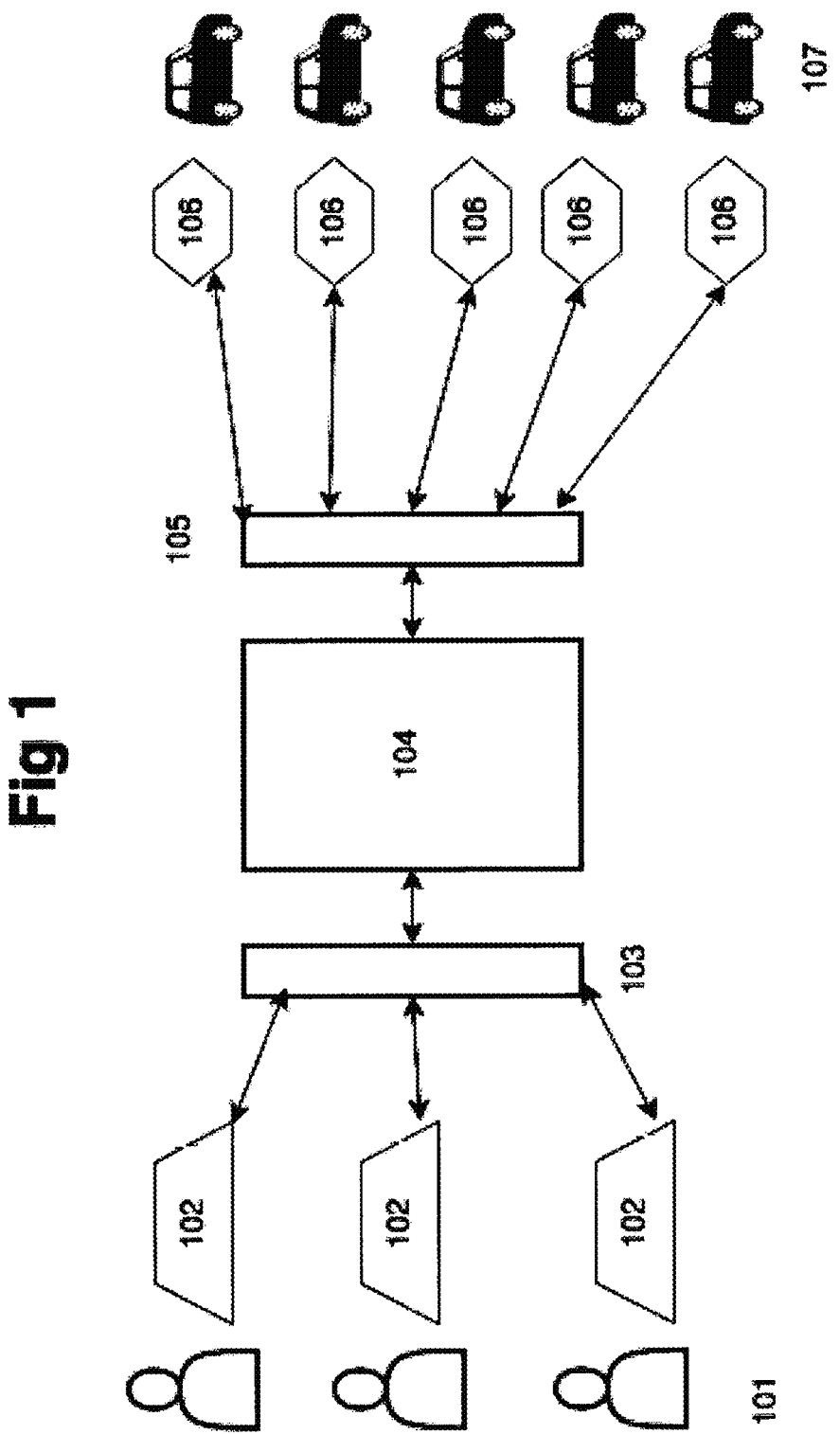
FIG. 1 is a detailed overview of the entire process architecture. Items labeled 101 are the remote vehicle operators. Items labeled 102 are the remote control and telemetry terminal systems used to inform the remote vehicle operators of vehicle conditions. Item 103 is the gateway to the processing algorithm which distributes vehicle service requests to the remote control and telemetry systems of the remote vehicle operators. Item 104 represents the matching engine between vehicles requiring service and remote vehicle operator terminals (102). Block 105 represents the gateway to the networked vehicle control endpoints. Items labeled 106 are terminals inside the semi-autonomous vehicles for manual remote control and telemetry. Items labeled 107 represent the semi-autonomous vehicle fleet.
Figure 2:
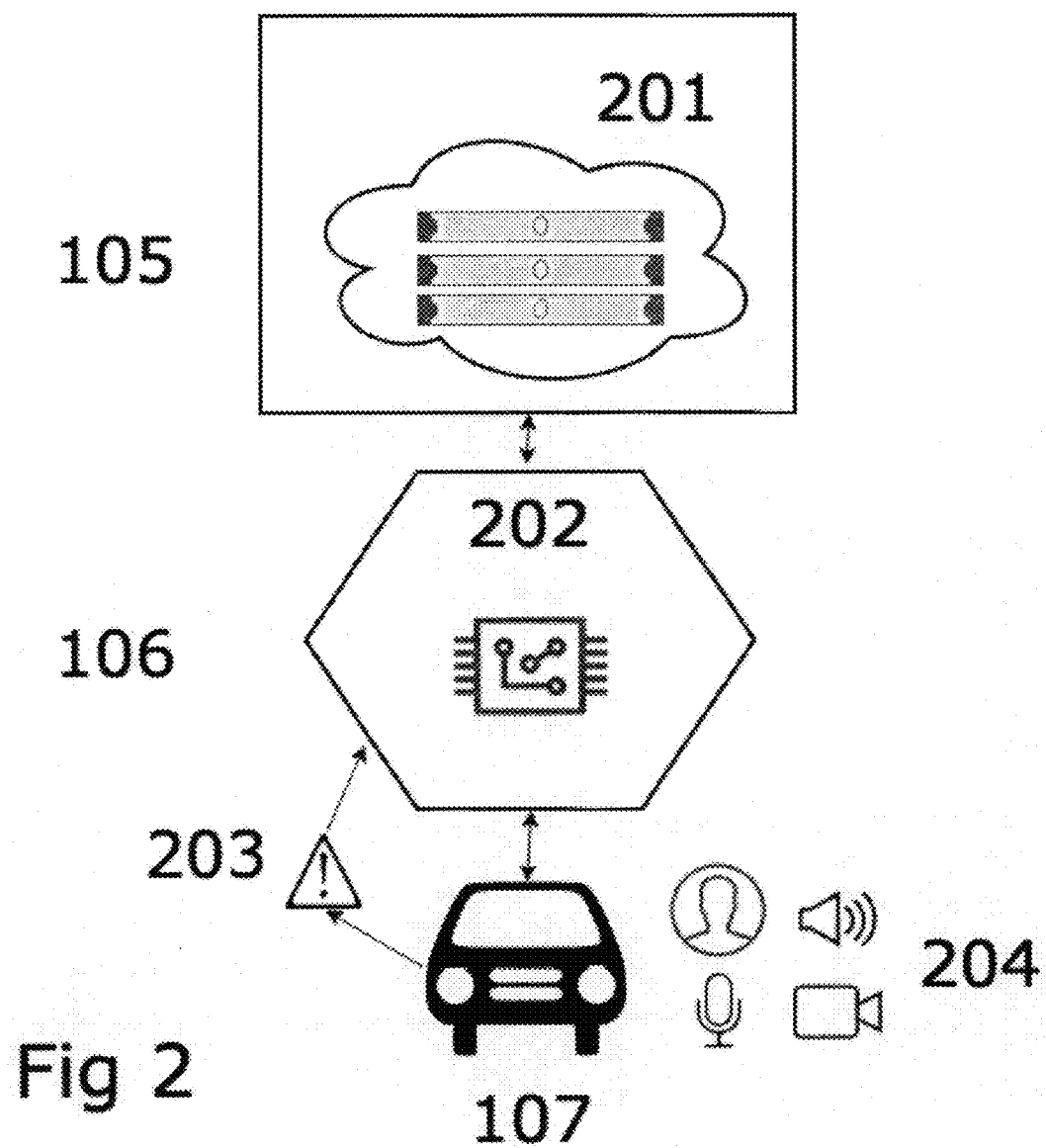
FIG. 2 is a detailed view of the vehicle side of operations. The items 105, 106, and 107 are from FIG. 1 as above. Item 201 indicates the remote gateway of one or more servers responsible for maintaining connectivity and/or for relaying various information. Item 203 is a system, potentially external to the invention, which reports, among other information, that the vehicle is in need of assistance, most probably from a human operator, and potentially that the vehicle has entered into a holding pattern. Item 202 is the logic bridge between the vehicle and the remote gateway. It receives updates from Item 203 that the vehicle is in need of some kind of assistance, brokers with the vehicle gateway 105, retrieves updates from the vehicle gateway, sends relevant data, and so forth. It works as a separate device or as software on a processor on the vehicle's existing computing systems. It may communicate with the gateway either its own self-contained internet connectivity system or through the vehicle's. Item 204 is the various input-output devices, not necessarily part of the invention, which nevertheless allow a remote human operator to receive audio and visual information about the vehicle's environment, and to transmit audio and video information to any nearby the vehicle, thereby enabling the human operator to perform certain functions, such as a discussion with a law enforcement officer, remotely.
Figure 3:
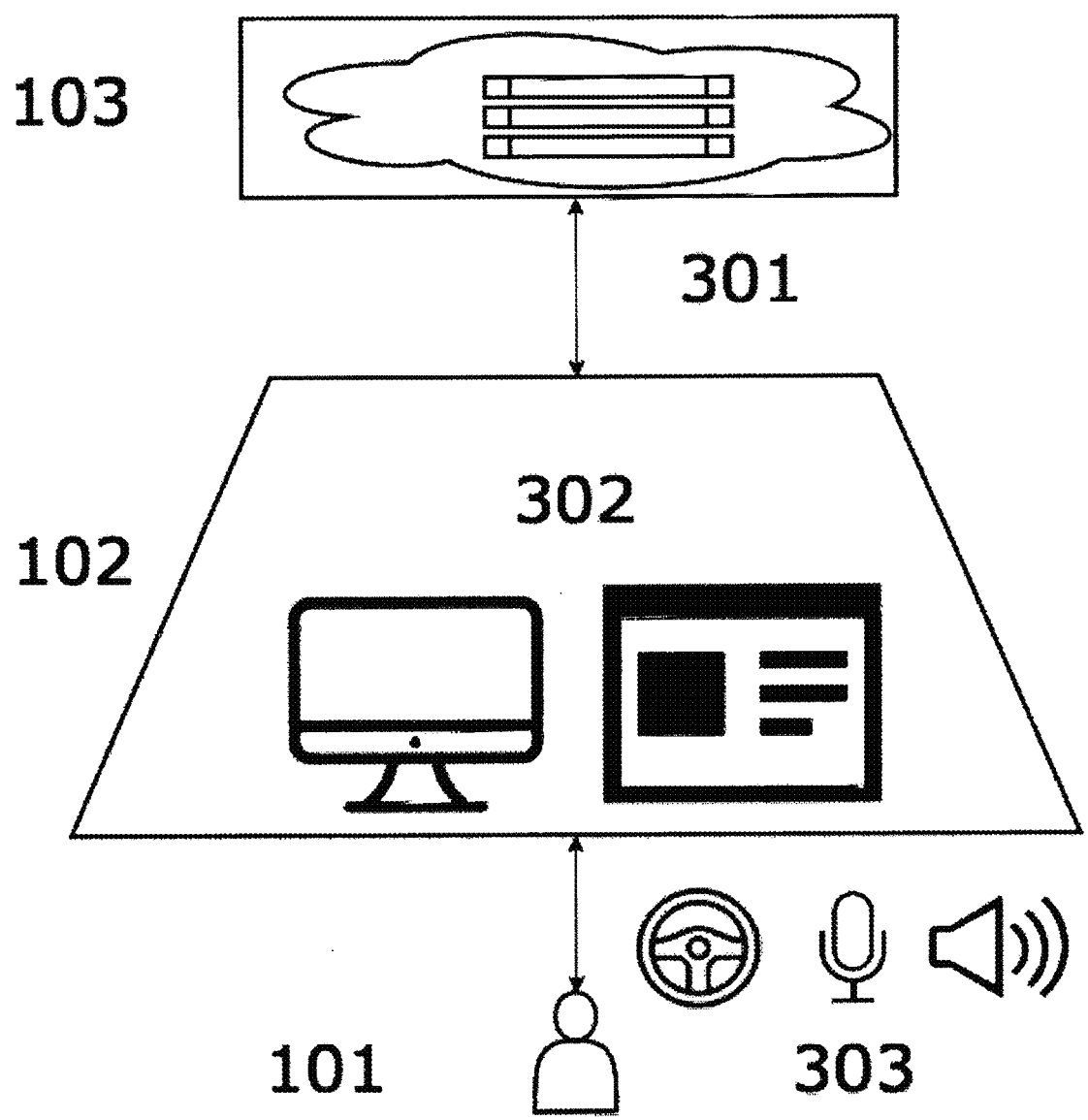
FIG. 3 is a detailed view of the human operator side of operations. The items 101, 102, and 103 are from FIG. 1 as above. Item 301 indicates the remote gateway of one or more servers responsible for maintaining connectivity and/ or for relaying various information. Item 302 indicates the portal system that the human operators will interact with. This portal may be designed for login, logout and potentially heartbeat to the system, and may track other associated data about the user. In some modes of operation it may give the operator discretion over tasks. It may be integrated with vehicle remote controls, such as a steering wheel, but this need not be the case. Item 304 is the various input-output devices, not necessarily part of the invention, which nevertheless allow a human operator to remotely control a vehicle and/or various I/O devices present with the vehicle, including local speakers, local microphones, local video capture devices, local video presentation screens, local steering systems, local accelerators, local braking systems, local signature/signing devices, etc., which correspond to systems on the vehicle.
Figure 4:
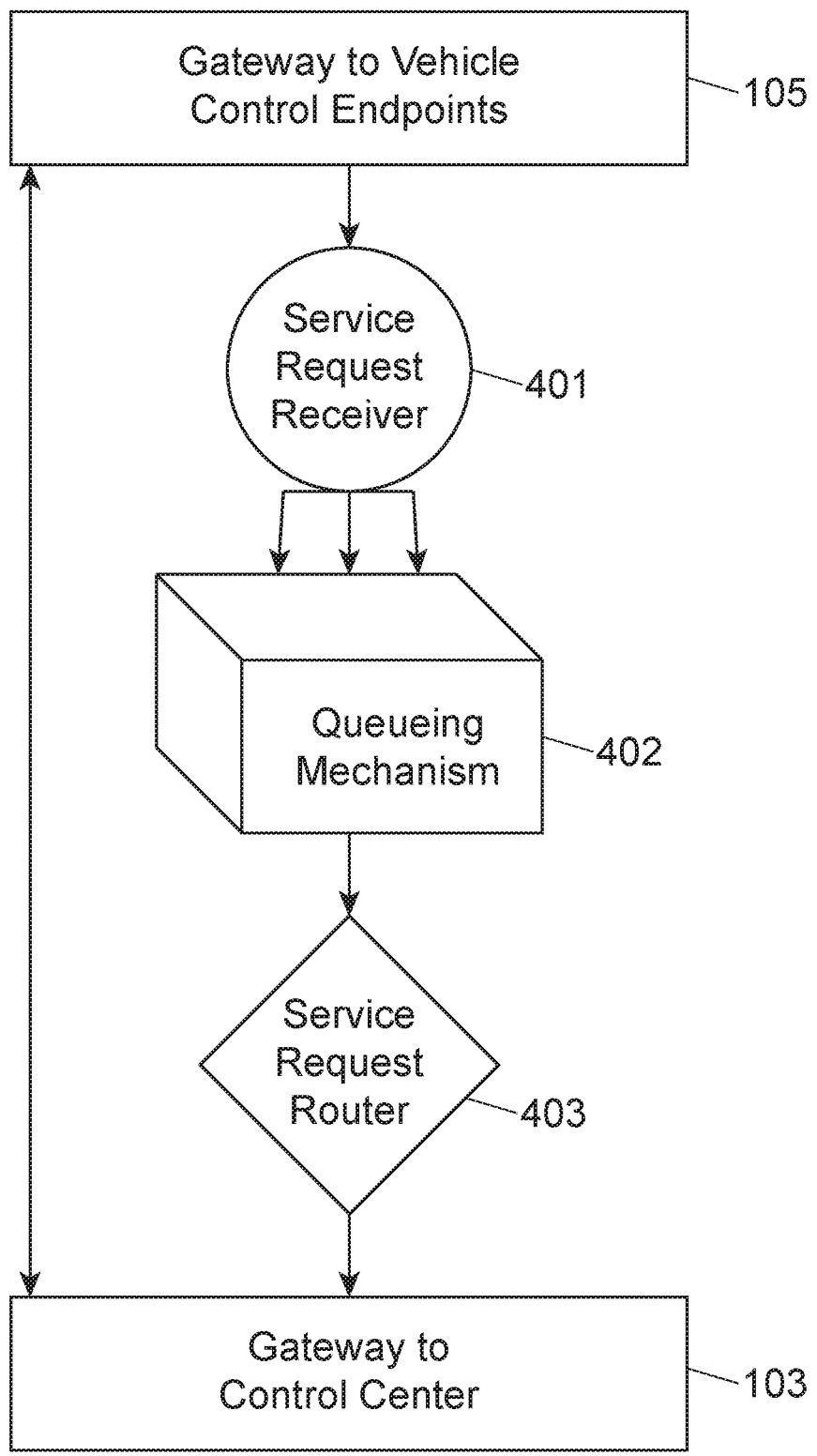
FIG. 4 items between 103 and 105 represents the flowchart of the algorithm which distributes vehicle intervention requests to human remote operators. 401 is an algorithm or hardware implementation of an algorithm which receives the service request from the vehicle gateway 105. Service requests are passed to 402, a queuing mechanism, which matches available operators to groups of remote operators. It may queue requests by some priority score, with secondary matching by time priority, or any other scoring mechanism which allocates vehicle requests to human operators. 403 represents a routing algorithm which will route the service request to the human operator/terminal which is most capable of handling the request. Control of or telemetry to and from the vehicle is then passed to the control center gateway 103, where it is passed on to individual human controllers at their terminals. For clarity of workflow, depiction of management of users entering and leaving the system is omitted in this figure. The gateways in 103 and 105 need not talk to each other directly.

We describe how to make and use the invention. The completed realization of the invention consists of the following parts: a transponder or similar communication device and/or channel for communicating with a computer server network indicating that the vehicle has entered into a state for which it is not fully prepared to handle on its own, which may range from simple interventions demanding human attention to full interactive human control over the vehicle; a similar (perhaps the same) communication channel for indicating which type of unexpected problem the vehicle has encountered and other related data and metadata which may be useful to convey to the system; a so-called queueing system and/or order matching system which queues vehicles in need of aid to be satisfied by human operators meeting given requirements, and a portion for executing the matches and clearing and so forth; a handover system responsible for initiating and continuing the access the human operator has to the vehicle; a portion for the vehicle side of things which maintains information about existing vehicles in the fleet or fleets, and updates in accordance with vehicles entering or leaving the system; a similar portion for the human side of things which tracks information about human operators currently available in the system, and as the enter or leave the system, or go idle, and so forth; a communication channel or portal by which human operators may interact with the system; a reporting system to indicate to the vehicles the status of their requests.

The invention may further depend on: a logic system inside the automated vehicle for determining when to request assistance and/or enter a holding pattern and/or attempt to relinquish control, a mechanism for achieving a holding pattern, a mechanism for providing remote operation of the vehicle (and for operation any embedded devices, say such as communication devices like speakers, for interaction during traffic stops) to the remote operator.

Potentially the most challenging part of the invention and the first part which should be attempted is the reporting mechanism in the automated vehicle (this clearly depends on other pre-existing pieces such as any mechanism for executing a holding pattern or determining requests for aid). This likely will require the updating of firmware or software programs on the vehicle fleet, and may even need to be integrated with the hardware, all of which can be an expensive undertaking. Regardless, this portion will need to interoperate in some fashion with the attention-requesting/ holding pattern mechanism. The communication between the vehicle and the reporting mechanism will need to be two-way. The vehicle will need to transmit messages including when it has entered the an attention-demanding state, when an unsolvable situation has resolved on its own, and various other success and failure modes and so on. The vehicle will also need to know various things, such as the expected wait time for an operator, whether the operator bank is unavailable and the vehicle will need to handle the problem on its own, when a handover is about to occur, and so on. In the best mode of operation this communication mechanism will rely on pre-existing internet connection mechanisms in the vehicle, but it is also feasible to incorporate a network connection in the communication device itself, and in some scenarios, high redundancy or low latency for example, this may be the best mode. Such a mechanism should be capable of maintaining a heartbeat so that the collecting system understands when vehicle is online and in use.

The portion of the system which maintains information about the vehicle fleet or fleets is the next most challenging. In the best implementation multiple servers will be available to service incoming communication from vehicles. When the number of vehicles is large, say more than 10,000, such a mode may be forced, since it will generally be infeasible to maintain that number of connections with a single server. This portion will need to monitor which vehicles are currently online, and will need to relay requests for aid to the matching engine. It should also be the collection point for various information that it is desirable for the vehicles to transmit. It should accept input from the matching engine about when requests are serviced and so on.

There is a related system that will track human operator availability instead of cars. In the best mode this will also consist of multiple servers instead of a single server, though such a construction may not be necessary when the number of human operators is small. This system must track whether a user is presently engaged with another vehicle or vehicles. The system must track when the human operator enters and leaves the system to service a vehicle request. In the best mode the system will track when the operator is idle and/or on break. The system may opt to collect data on the performance of the operator. This system will connect to the matching engine to provide information about the human operator side. It should accept input from the matching engine in order to update the status about the availability of operators and other system updates.

A portal will need to be constructed so that the human operators can connect to the system. This should contain some manner of login system, and some manner of real-time communication. In the best mode, such a system will be integrated with the remote control system for the vehicle, or will at least communicate with such. In the best mode, the option will exist to give human operators discretion in choosing a vehicle to assist.

Either the human operator or the vehicle may detect that the problem has been solved, and will report this back to the matching portion of the system, which will end the pairing and mark the case as solved, initiating any related cleanup. Most commonly a successful outcome will remove the vehicle from the pool of vehicles needing assistance.

Human operators may "work remotely" via the internet (ie, they need not be located in the same office center) if they possess the necessary gear, or they may be located together in an office, or some combination thereof, and so on.

The queueing system or matching engine is the center portion of the invention. This system reconciles the pool of cars with the pool of available human operators. The system assigns vehicles to human operators. This section of the invention will understand what the number of available operators is, what the number of vehicles requesting assistance is, and will further know the attributes of each operator and the attributes of each vehicle. In the best mode, the system will support pairing rules based on attributes. The system may also implement prioritized and/or time-based matching of vehicles to operators. The system will assign vehicles to operators. The system will not assign more than one vehicle to an operator, unless so desired. The system will not assign multiple operators to a vehicle, unless so desired. (Perhaps it will be necessary to buddy-up to remove the potential for operator error. It is conceivable a multi-operator vehicle such as a commercial airliner or a fire engine will be automated.)

In the most basic mode, the software may consider both automated vehicles and human operators fungible, in the sense that it is not necessary to distinguish between the different ailing vehicles and the different available operators. In more advanced modes and in the best mode, the software may categorize or rate the different types of problems facing the vehicles, and may categorize or rate the different human operators, based on capabilities and/or previous performances. A fluent English-speaker may be necessary for interaction with law enforcement officers, while in general a non-English speaker who can operate motor vehicles is sufficient for driving tasks. Human operators for specialized tasks, aka accident prevention, may be selected based on fast reflexes and high levels of vigilance. Prior to or coincident with such a system it may be necessary to record performance of the human operator in order to measure over time whether desirable outcomes were reached for the automated vehicles in given problem situations. Another dimension on which ailing vehicles and operators may be striated is on criticality or time-sensitivity: a different and more time-sensitive response is necessary for an occurred or imminent vehicle crash versus diagnostic or maintenance level interventions.

The invention claimed is:

1. A method of triaging control requests of an automated vehicle, the method comprising:
   receiving, from a vehicle under automatic control, a service request to assume remote manual control of the vehicle, the service request including an assistance message, the assistance message including a requested operator capability;
   pairing a human vehicle operator in a bank of available human vehicle operators with the vehicle under automatic control based at least in part on the assistance message and on a comparison of a capability attribute score of the human vehicle operator to other human vehicle operators in the bank of available human vehicle operators with respect to the requested operator capability;

routing an assignment of manual control of the vehicle to the human vehicle operator in the bank of available human vehicle operators; and transferring manual control of the vehicle to the human vehicle operator in the bank of available human vehicle operators during a manual control period.

2. The method of claim 1, further comprising:

ending participation in transmission of the remote vehicle navigation signals to the automated vehicle and ending manual control by the human vehicle operator over the automated vehicle upon compliance with the assistance instructions.

3. The method of claim 1, further comprising:

monitoring control signals sent from the human vehicle operator to the vehicle;

monitoring vehicle data received from the vehicle during the manual control period; and updating a capability attribute score of the human vehicle operator based at least in part on the control signals and the vehicle data.

4. The method of claim 1, wherein the pairing operation is based at least in part on an urgency level of the service request.

5. The method of claim 4, wherein the urgency level includes a threat indication to the vehicle in the service request.

6. The method of claim 1, wherein the bank of available human vehicle operators a calls out to a re-insurance bank of human vehicle operators and the operation that routes the assignment of manual control of the vehicle to the human vehicle operator in the bank of human vehicle operators further routes the assignment of manual control of the vehicle to another human vehicle operator in the re-insurance bank of human vehicle operators.

7. The method of claim 1, further comprising:

pairing a second human vehicle operator from the bank of available human vehicle operators with the vehicle, the second human vehicle operator being an observer of telemetric data of the vehicle and having a communications channel with the human vehicle operator.

8. An automated vehicle system, the system comprising:

an automated vehicle navigation system for determining navigation control signals to a vehicle based on sensor data reflecting an environment of the automated vehicle;

a manual assistance arbiter to determine the automated vehicle is in need of manual control based on the environment of the automated vehicle during a service period; and a logic bridge to transmit a service request to a bank of available manual human vehicle operators, the logic bridge transmitting a another service request to another bank of available human vehicle operators based on an elapsed time from transmission of the service request, the logic bridge further receiving an assignment of the service request to a human vehicle operator in the another bank of human vehicle operators and vehicle control signals from the human vehicle operator during the service period.

9. The automated vehicle system of claim 8, wherein the service request includes a request for verbal interaction between the human vehicle operator and a human in the environment of the vehicle.

10. The automated vehicle system of claim 8, wherein the service request includes a vehicle operation capability of the human vehicle operator.

11. The automated vehicle system of claim 8, wherein the automated vehicle system has a role that is nonhomogeneous with roles of other automated vehicle systems transmitting service requests to the bank of available manual human vehicle operators.

12. A method of remote automatic vehicle control, the method comprising:

communicating an availability message to a service queue provider, the service queue provider triaging remote manual vehicle control requests;

receiving, by a matching engine of the service queue provider, a service request to assume remote manual control of an automated vehicle, the service request including assistance instructions;

communicating an acceptance of the service request to the service queue provider;

accepting remote manual control of the automated vehicle;

transmitting remote vehicle navigation signals to the automated vehicle in accordance with the assistance instructions; and ending participation in transmission of the remote vehicle navigation signals to the automated vehicle and ending manual control by the human vehicle operator over the automated vehicle before compliance with the assistance instructions.

13. The method of claim 12, wherein the availability message includes available vehicle control signal input hardware.

14. The method of claim 12, wherein the availability message includes one or more vehicle operator capabilities, the one or more vehicle operator capabilities being associated with a task included in the service request.

15. The method of claim 12, wherein the assistance instructions include a request for remote verbal communication with a person in the environment of the automated vehicle.

16. A method of triaging control requests of an automated vehicle, the method comprising:

receiving, from a vehicle under automatic control, a service request to assume remote manual control of the vehicle, the service request including an assistance message;

increasing a number of potential human vehicle operators by calling out to a re-insurance bank of human vehicle operators;

pairing a human vehicle operator in the re-insurance bank of human vehicle operators with the vehicle under automatic control based at least in part on the assistance message;

routing an assignment of manual control of the vehicle to the human vehicle operator in the re-insurance bank of available human vehicle operators; and transferring manual control of the vehicle to the human vehicle operator in the re-insurance bank of available human vehicle operators during a manual control period.

17. The method of claim 16, wherein the denial of the request to pair a human vehicle operator is based on a lack of availability of human vehicle operators in the bank of human vehicle operators.

* * * * *